US011352024B2

(12) United States Patent
Smith et al.

(10) Patent No.: US 11,352,024 B2
(45) Date of Patent: Jun. 7, 2022

(54) AUTONOMOUS VEHICLE EMERGENCY ROUTE GUIDANCE

(71) Applicant: NIO USA, Inc., San Jose, CA (US)

(72) Inventors: Alex J. Smith, Pacifica, CA (US); Ali A. Ayoub, San Jose, CA (US); Stefan T. Hilligardt, Half Moon Bay, CA (US)

(73) Assignee: NIO USA, Inc., San Jose, CA (US)

( * ) Notice: Subject to any disclaimer, the term of this patent is extended or adjusted under 35 U.S.C. 154(b) by 149 days.

(21) Appl. No.: 16/737,695

(22) Filed: Jan. 8, 2020

(65) Prior Publication Data

US 2021/0206388 A1 Jul. 8, 2021

(51) Int. Cl.
*B60W 60/00* (2020.01)
*G05D 1/02* (2020.01)
*B60W 50/029* (2012.01)

(52) U.S. Cl.
CPC ...... *B60W 60/0015* (2020.02); *B60W 50/029* (2013.01); *G05D 1/0214* (2013.01); *G05D 2201/0213* (2013.01)

(58) Field of Classification Search
CPC ......... G05D 1/0214; G05D 2201/0213; G05D 1/00; G05D 1/0077; B60W 2050/029; B60W 2050/0292; B60W 2050/023; B60W 20/50; B60W 50/022; B60W 50/0205; B60W 60/0015; B60W 50/029; B60W 50/0062; B60W 50/02; B60W 50/021; B60W 50/023; B60W 50/0292; B60W 50/0295; B60W 50/0297; B60W 50/035; B60W 20/00; G06F 11/181; G06F 11/18; G06F 11/182; G06F 11/183; G06F 11/184; G06F 11/2023; G06F 11/2025; G06F 11/2028; G06F 11/203; G06F 11/2035; B60L 58/00; B60L 58/10; B60L 3/003; B60L 3/0046; B60L 3/0061; B60L 3/0076; B60L 3/0092; B60L 3/0084; B60L 15/20; B60L 15/2009; B60L 15/2018; B60L 15/2027; B60L 15/2036; B60L 15/2054; B60L 2220/46; B60L 2260/28;

(Continued)

(56) References Cited

U.S. PATENT DOCUMENTS 7,133,759 B2 * 11/2006 Fry .................. B60T 8/885
701/70
9,446,747 B2 * 9/2016 Fosdike ................ B60T 7/20
(Continued)

FOREIGN PATENT DOCUMENTS

KR 20180102317 9/2018

*Primary Examiner* — Anthony R Jimenez
(74) *Attorney, Agent, or Firm* — Sheridan Ross P.C.

(57) ABSTRACT

A system for route guidance, the system comprising a driving controller, wherein the driving controller is configured to receive sensor output from at least one sensor, wherein, based on the received sensor output, the driving controller determines, for a common time interval, a first set of route actions and a second set of route actions; and a vehicle motion controller configured to receive, from the driving controller, the first set of route actions and the second set of route actions, and wherein, during the common time interval, the first set of route actions are executed when the vehicle is in a first state and the second set of route actions are executed when the vehicle is in a different second state.

20 Claims, 8 Drawing Sheets

(58) Field of Classification Search
CPC ...... B60L 53/00; B60L 53/12; B60L 2260/00;
B60L 2260/20; B60L 2260/26; B60L
2260/32; B60L 2260/40; B60L 2260/42;
B60L 2260/44; B60L 2260/46; B60L
2260/48; B60L 2260/50; B60L 2240/60;
B60L 2240/62
USPC ..................................................... 701/25, 22
See application file for complete search history.

(56) References Cited

U.S. PATENT DOCUMENTS

| | | |
|---|---|---|
| 10,139,828 B2 | 11/2018 | Ho et al. |
| 2015/0177007 A1 | 6/2015 | Su et al. |

\* cited by examiner

AUTONOMOUS VEHICLE EMERGENCY ROUTE GUIDANCE

FIELD

The present disclosure is generally directed to route guidance systems, in particular, towards emergency route guidance methods and systems.

BACKGROUND

In recent years, transportation methods have changed substantially. This change is due in part to a concern over the limited availability of natural resources, a proliferation in personal technology, traffic safety, and a societal shift to adopt more environmentally friendly transportation solutions.

One of these changes is the proliferation of autonomous driving technology. The proliferation of autonomous driving technology has made every day driving easier. As innovation in this field grows so will its ubiquity in vehicles. However, autonomous driving technology is not without its challenges. One challenge of autonomous driving technology is how a vehicle reacts in situations where there is one or multiple failures in a vehicle driving in autonomous mode.

For instance, if a hardware failure were to impair the autonomous capabilities of a vehicle during autonomous driving mode, the autonomous driving mode may turn-off and force the drive to assume, with minimal advance warning, operating the vehicle in manual mode (this may apply to both semi-autonomous or fully autonomous vehicles). Generally, drivers must remain alert to drive an autonomous vehicle, however drivers may not be alert at the exact moment of failure. The lack of alertness can create unsafe conditions for the driver as well as others on the road.

Furthermore, to mitigate against these types of failures redundant measures can be added. However, in the example above if a redundant hardware component were added to the vehicle, this still may not resolve the issue. Redundant hardware components can suffer from the same flaw as the original because they may have common hardware designs. For example, two identical processors (a main processor and a redundant processor) can be placed into an autonomous vehicle to perform a specific task, but if the main processor has a hardware design flaw then it is quite possible that the redundant processor may also contain the same flaw; ultimately resulting in the same failure as the main processor. Therefore, additional redundancy measures are needed to mitigate against these types of failures.

As more and more autonomous capable vehicles are manufactured, a solution to this issue becomes more pressing. The present disclosure satisfies these and other needs.

SUMMARY

Electronic devices can be susceptible to hardware and software failures; to mitigate the harm of these potential failures during autonomous driving mode, the autonomous drive system can continuously determine suitable pathways for the vehicle in case of an emergency. The autonomous driving system can continuously update one or more pathways to be prepared for a number of different scenarios. For instance, the autonomous driving system can calculate (and/or determine) a first pathway that is the vehicle's main course and can calculate (and/or determine) a second pathway that can consist of an emergency route. The emergency route is a set of instructions that the autonomous driving system will execute in the event of a hardware or software failure, resulting in a loss of communication between the autonomous driving system and any downstream controllers (or if communication is lost between downstream controllers). The autonomous driving controller can continually be updating or sending new sets of emergency instructions (as well as main course pathway) and sending the updated emergency instructions to the downstream controllers directly or through other downstream controllers. For instance, the autonomous driving controller can send updated emergency instructions to an intermediate controller so that the intermediate controller can send it to a further downstream controller. In the event that communication is lost between the autonomous driving system and any downstream controllers (or if communication is lost between downstream controllers), the downstream controllers will be capable of executing the last received emergency instructions and acting accordingly to attempt to achieve a successful emergency stop.

The embodiments of the present disclosure can advantageously improve the emergency response capabilities of autonomous driving systems and provide increased safety for electric vehicle drivers, passengers, and bystanders. The embodiments can be particularly useful when the vehicle is operating in SAE levels 4 or 5. As will be appreciated, in SAE level 0 the vehicle is fully manual; in SAE level 1 the vehicle has one fully manual aspect; in SAE level 2 the vehicle has automated steering and acceleration capabilities; in SAE level 3 the vehicle further has the ability to detect the external environment around the vehicle but still requires human override; in SAE level 4 the vehicle has the capabilities of SAE level 3 and further is able to intervene itself in the event of abnormal situations, such as a system failure, and does not require human intervention, though a manual override feature may be an option); and in SAE level 5 the vehicle has the capabilities of SAE level 4 and further can provide a much more responsive and refined service, comparable to that of adaptive and situational manual human driving.

Additional features and advantages are described herein and will be apparent from the following Description and the figures.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

In some embodiments, an autonomous driving system continuously calculate different sets of first and second sets of instructions corresponding to different alternative first and second pathways for the vehicle to execute in first or second modes of operation, respectively. The first pathway corresponds to a normal (non-emergency or error-free) operational mode and to a selected course based on instructions received from the operator and the second pathway corresponds to an abnormal (emergency or error) operational mode and to an emergency route. The emergency route corresponding to the second pathway is a pathway that the autonomous driving system determines that the downstream controllers will actuate in the event that the link in the chain is broken/lost or another emergency or error condition is determined to exist. The autonomous driving controller will continually update the first and second sets of instructions while the vehicle is in motion and operating in the normal operation mode. The first and second sets of instructions can be determined and updated, for example, using serial or parallel processing. The alternate first and second sets of instructions are sent to the nodal links in the hierarchical chain of processors to store and execute in a common time interval or period. In the event that an inter-nodal link between processing nodes in the chain is broken or lost, the remaining processing nodes in the hierarchy downstream of that broken or lost connection can execute the second set of instructions (rather than the first set of instructions) and cause the vehicle to follow the second pathway, for example to come to a successful emergency stop.

The statuses of the inter-nodal links can be determined by many techniques, such as checking message files for errors, checking link status by internodal node status pings and responses such as used in the Internet Control Message Protocol, checking timestamps in received messages to determine changes in message transmission speed, and the like.

Figure 1:
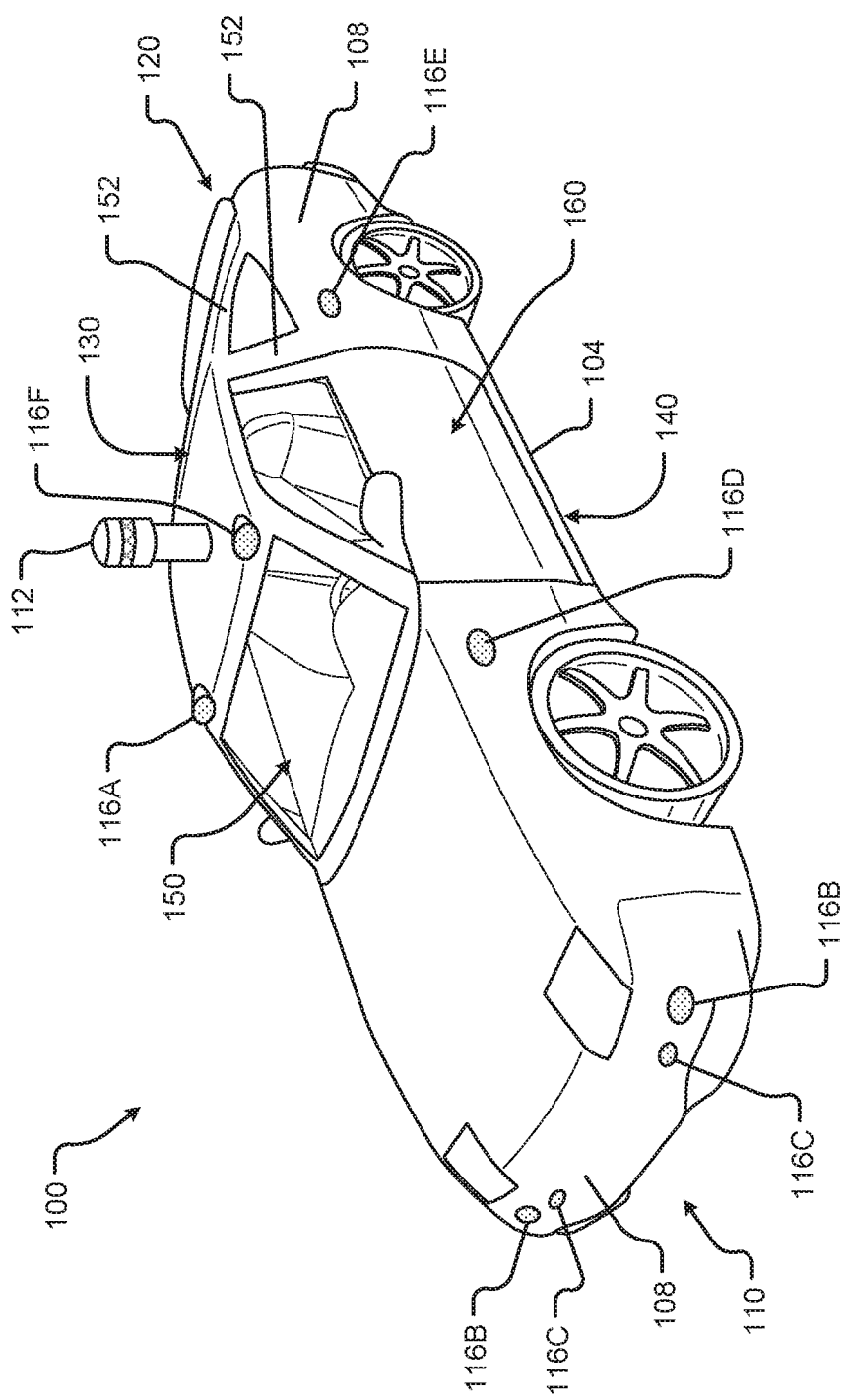
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
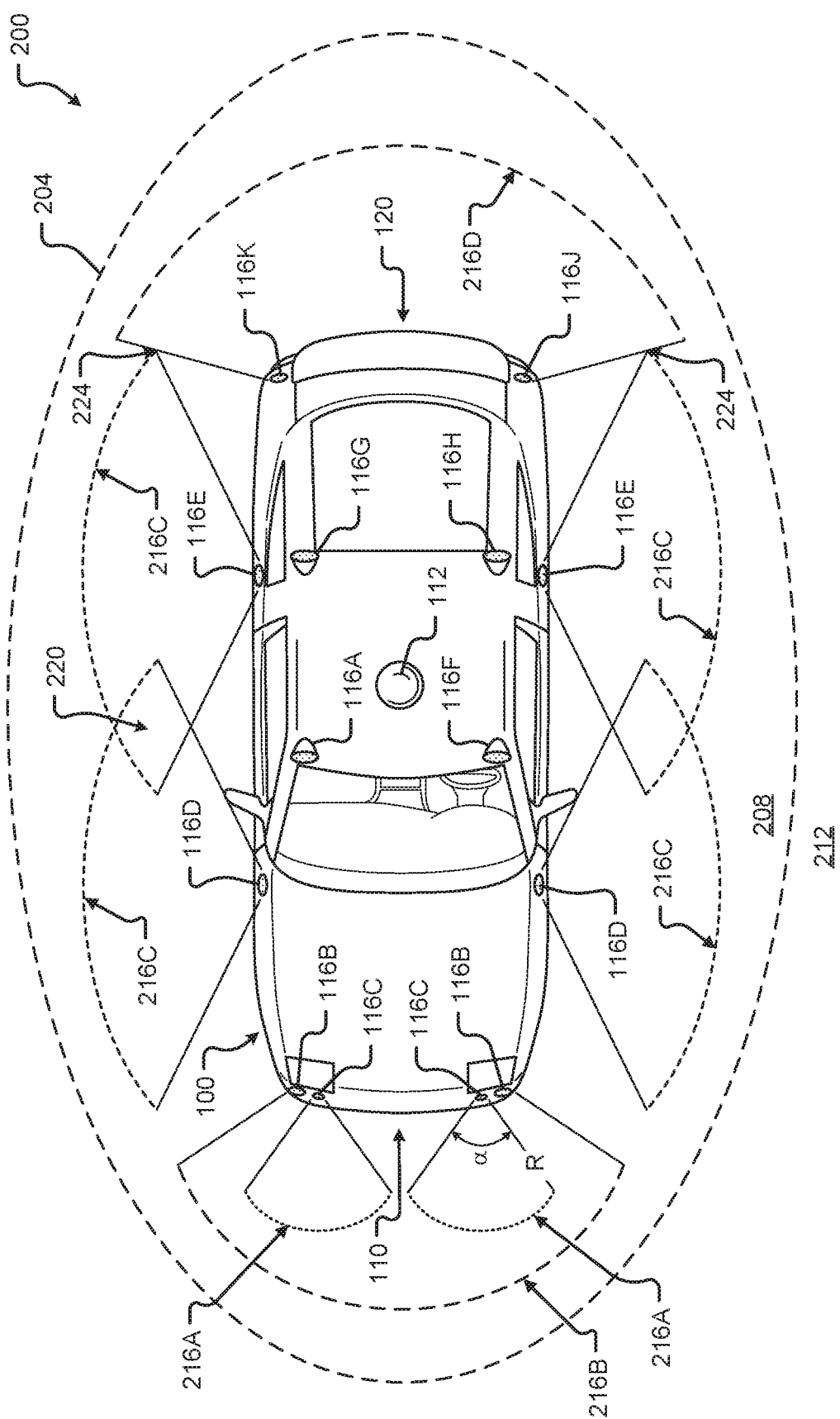
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
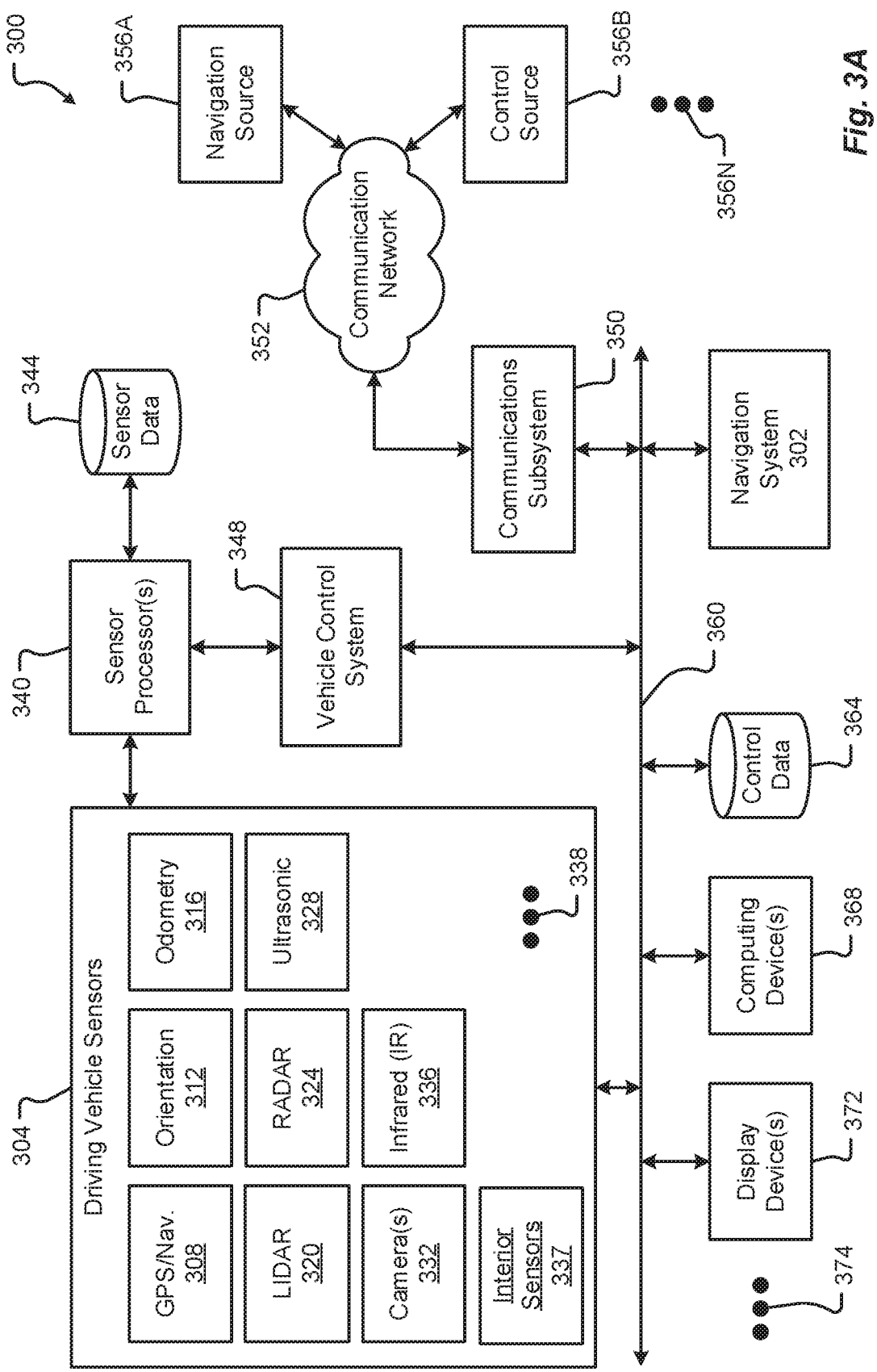
FIG. 3A is a block diagram of an embodiment of a communication environment of the vehicle in accordance with embodiments of the present disclosure.
Figure 3B:
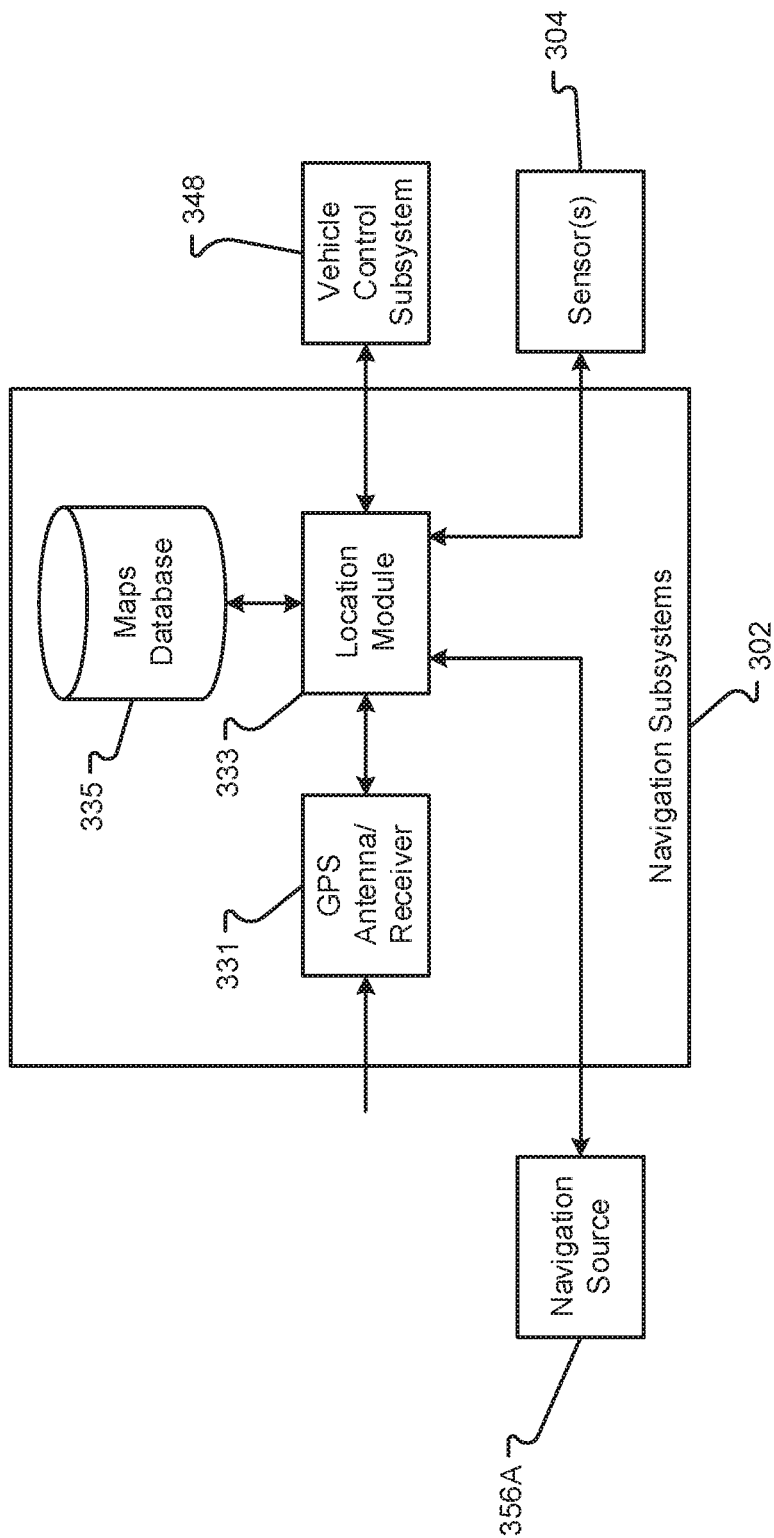
FIG. 3B is a block diagram of an embodiment of a navigation system of the vehicle in accordance with embodiments of the present disclosure.

FIGS. 3A and 3B are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15X™ family of sensors, Garmin® GPS 16X™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

A navigation subsystem 302 can include any hardware and/or software used to navigate the vehicle either manually or autonomously. The navigation subsystem 302 may be as described in conjunction with FIG. 3B.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. Raw and/or processed sensor data may also be stored or further processed by vehicle control system 348. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate the speed of the vehicle 100 by controlling an output signal to the accelerator and/or braking system of the vehicle. In this example, the vehicle control system 348 may receive sensor data (or post-processed sensor data) describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few. In some embodiments, data provided by navigation subsystem 302 (or navigation source 356A) can be used by vehicle control system 348 to assist in the operation of autonomous driving mode.

In some embodiments, the vehicle control system 348 may receive control information from one or more control sources 356B (or from navigation subsystem 302). The control source 356 may provide vehicle control information including autonomous driving control instructions, vehicle operation override control instructions, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information. Vehicle-related information can also refer to various parameters regarding the velocity, acceleration, and trajectory (or angle of motion of the vehicle relative to a selected reference) of the vehicle 100 (one skilled in the art would appreciate that the list provided is non-exhaustive)

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR, camera and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

In some embodiments, the vehicle control system 348 may comprise a number of components. For example, the vehicle control system 348 may comprise an autonomous driving controller 410, vehicle motion controller 430, actuation controllers, microprocessors, memory, gateways, communication modules, sensors, and/or any combination thereof. In other embodiments, vehicle control system 348 may not comprise a particular component (or components) that is otherwise present in vehicle 100. For instance, vehicle control system 348 may not comprise autonomous driving controller 410 but autonomous driving controller 410 may still be present in vehicle 100 and communicate with vehicle control system 348. Furthermore, vehicle control system 348 may not comprise autonomous driving controller 410 and vehicle motion controller 430 but these components may still be in vehicle 100 and communicate with vehicle control system 348.

Figure 4:
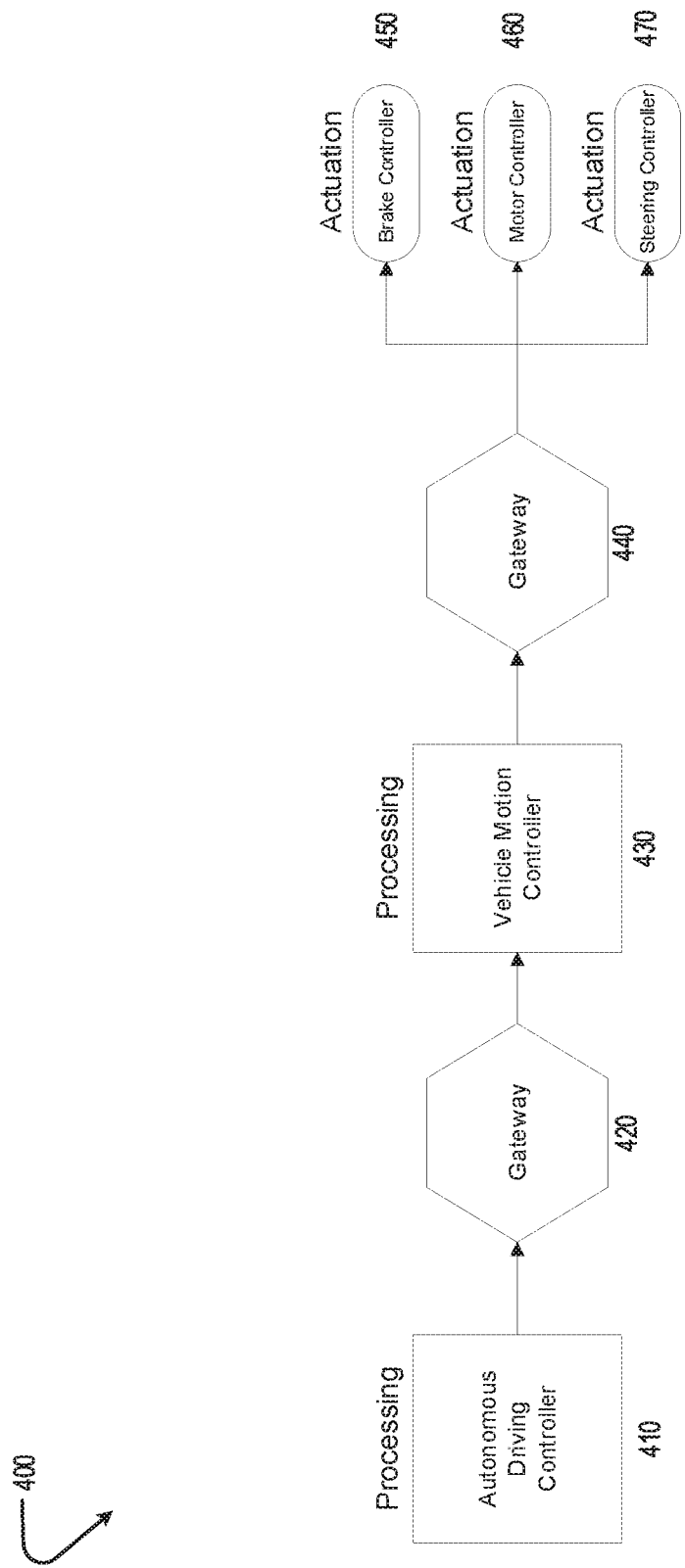
FIG. 4 shows an autonomous vehicle control authority architecture.

FIG. 4 shows the autonomous authority driving architecture 400. The autonomous driving authority architecture 400 is where autonomous driving instructions are determined and executed. As stated above, vehicle control system 348 can be capable of receiving sensor data about the surrounding environment and make adjustments to vehicle's 100 path via adjustments to acceleration, steeling, power output, and/or braking. FIG. 4 shows an embodiment of how vehicle control system 348 can execute the aforementioned adjustments. As will be appreciated, the vehicle control system 348 may be entirely within the vehicle or located remotely or distributed between a remote control system and a local control system in the vehicle 100. In some embodiments, autonomous authority driving architecture 400 may be comprised within vehicle control system 348. However, in other embodiments vehicle control system 348 may not comprise all components of autonomous authority driving architecture 400. As stated above, autonomous driving controller 410 can be located outside of vehicle control system 348 (still located in vehicle 100) but in communication with vehicle control system 348. In the embodiment of FIG. 4, autonomous authority driving architecture 400 is located within vehicle control system 348.

Autonomous driving controller 410 is a processing unit that can receive sensed object information, vehicle-related information, and exterior environmental information; herein known as global sensor information. Autonomous driving controller 410 receives global sensor information from sensor processor(s) 340, driving vehicle sensors 304, internal sensors, and/or any combination thereof. The driving vehicle sensors 304 can sense internal and/or external information relative to the vehicle. Autonomous driving controller 410 can receive global sensor data directly from the aforementioned devices or it may receive global sensor data through intermediaries/gateways.

In some embodiments, the autonomous driving controller 410 may comprise a microcontroller unit (MCU or Application-Specific Integrated Circuit or ASIC), including one or more processors, interconnected with a memory via at least one connection, one or more sensors, and/or a communications bus. The memory may be one or more disk drives, optical storage devices, solid-state storage devices such as a random access memory (RAM) and/or a read-only memory (ROM), which can be programmable, flash-updateable and/or the like. Additionally or alternatively, the autonomous driving controller 410 may include a communications module and/or other components interconnected with the communication bus. The communications module may include a modem, a network card (wireless or wired), an infra-red communication device, etc. and may permit data to be exchanged with a network and/or any other charger or processor.

Vehicle motion controller 430 is a processing unit that is typically less capable than the autonomous driving controller 410. Vehicle motion controller 430 mainly receives vehicle-related information (vehicle motion controller 430 commonly has either a dedicated or a secondary accelerometer and gyroscope). However, vehicle motion controller 430 can also receive limited exterior environmental information (other than what it received from autonomous driving controller 410). For instance, vehicle motion controller 430 can receive GPS information however the GPS information is fairly limited because localization with GPS is not sophisticated and the received GPS information would be vague. Therefore, it can be said that vehicle motion controller 430 is substantially "blind" to the outside environment. Although, vehicle motion controller 430 does not receive much sensor information related to the environment, vehicle motion controller 430 can receive significant information related to vehicle 100. For instance, vehicle motion controller 430 can receive vehicle-related information and determine the longitudinal or lateral velocity of vehicle 100 in real time. Thus, vehicle motion controller 430 is substantially "blind" to the outside environment but is still capable of determining vehicle-related information related to vehicle 100.

Vehicle motion controller 430 may be in direct communication with autonomous driving controller 410, be in communication through gateway 420, or communicate with autonomous driving controller 410 through other means. Similarly, vehicle motion controller 430 may be in direct communication with actuation controllers (450, 460, and 470), be in communication with them through gateway 440, or communicate with actuation controllers through other means. Although, vehicle motion controller 430 is in communication with actuation controllers, vehicle motion controller 430 cannot physically control the path of vehicle 100; only actuation controllers can physically control the path of vehicle 100.

In some embodiments, the vehicle motion controller 430 may comprise a microcontroller unit (MCU or Application-Specific Integrated Circuit or ASIC), including one or more processors, interconnected with a memory via at least one connection, or communications bus. The memory may be one or more disk drives, optical storage devices, solid-state storage devices such as a random access memory (RAM) and/or a read-only memory (ROM), which can be programmable, flash-updateable and/or the like. Additionally or alternatively, the vehicle motion controller 430 may include a communications module, and/or other components interconnected with the communication bus, charger (not shown), and/or other systems. The communications module may include a modem, a network card (wireless or wired), an infra-red communication device, etc. and may permit data to be exchanged with a network and/or any other charger or processor in the electric power distribution system as described.

Actuation controllers may comprise brake controller 450, motor controller 460, and steering controller 470. One skilled in the art would appreciate there may be additional actuation controllers not shown, for instance a vehicle speed controller, a vehicle transmission controller, a vehicle stability controller, a traction controller, a wheel slip controller, and/or any combination thereof. Actuation controllers physically control the path and speed of vehicle 100 because the actuation controllers control the actuators (not shown).

The actuation controllers are the simplest controller shown in FIG. 4 and can receive simple instructions and control the actuators to control the path of vehicle 100. In some embodiments, the actuation controllers may comprise a microcontroller unit (MCU or Application-Specific Integrated Circuit or ASIC), including one or more processors, interconnected with a memory via at least one connection, and/or communications bus. The memory may be one or more disk drives, optical storage devices, solid-state storage devices such as a random access memory (RAM) and/or a read-only memory (ROM), which can be programmable, flash-updateable and/or the like. Additionally or alternatively, the actuation controllers may include a communications module, and/or other components interconnected with the communication bus, charger (not shown), and/or other systems. The communications module may include a modem, a network card (wireless or wired), an infra-red communication device, etc. and may permit data to be exchanged with a network and/or any other charger or processor in the electric power distribution system as described.

Once autonomous mode has been engaged by the driver of vehicle 100, autonomous driving controller 410 can, while operating in a normal operation mode, generate a list or set of autonomous driving instructions to be executed by vehicle 100 that will cause the vehicle 100 to travel along the first pathway. Autonomous driving controller 410 can be capable of receiving this global sensor data and determining whether any adjustments to the acceleration, power output, steering, and/or braking of the vehicle 100 are necessary. For instance, if autonomously driving vehicle 100 is approaching a curve, autonomous driving controller 410 can determine how the vehicle 100 should react by generating a serial sets of instructions for a given time interval that cause the vehicle to move sequential along multiple different pathways to navigate the curve. The autonomous driving instruction set can comprise a listing of instructions regarding how the vehicle should adjust various factors (such as velocity, acceleration, steering angle, etc.) over a period of time (or given interval). The time horizon over which autonomous driving controller 410 may determine a set of autonomous driving instructions can be anywhere from approximately 5 milliseconds to 10 seconds. In other words, autonomous driving controller 410 can determine a set of autonomous driving instructions for as little as five milliseconds in the future or as long as ten seconds in the future.

The autonomous driving instructions can be a list of waypoint instructions or in other embodiments the autonomous driving instructions could buffer the actual actuation commands (e.g. steering angle commands, longitudinal acceleration commands, etc.). An example of a waypoint instruction could be that at five milliseconds seconds (five milliseconds relative to the instant that the autonomous driving mode was activated or an already active autonomous driving controller 410 determined an adjustment was needed) vehicle 100 should use brakes to decelerate longitudinal velocity by 0.2 m/s$^2$, adjust steering angle 3 degrees; then at ten milliseconds vehicle 100 should use brakes to decelerate longitudinal velocity by 0.4 m/s$^2$, adjust steering angle 3 degrees. Each of the foregoing sets of commands can correspond to different pathways. Waypoint instructions are merely an example of autonomous driving instructions, and one skilled in the art would appreciate there are several types of autonomous driving instructions. Once autonomous driving controller 410 has determined/generated the autonomous driving instructions the autonomous driving controller 410 may send the list to vehicle motion controller 430. In alternative embodiments, autonomous driving controller 410 can be enabled to send autonomous driving instructions to actuation controllers directly.

Autonomous driving instructions can be updated in real time, as surroundings and other environmental factors or operator commands can change at any moment. Autonomous driving controller 410 can be constantly receiving new global sensor data thereby enabling autonomous driving controller 410 to continuously send new autonomous driving instructions (or update already sent autonomous driving instructions), so as to account for new data. New autonomous driving instructions can be sent from the autonomous driving controller 410 at least once every hundred milliseconds, however autonomous driving controller 410 is capable of determining and sending new or updated instructions as quickly as every millisecond or as slowly as every minute.

The vehicle motion controller 430 can further process received autonomous driving instructions. Vehicle motion controller 430 is able to take the complex instructions given by the autonomous driving controller 410 and further process the instructions such that actuation controller(s) can accomplish the instructions determined by the autonomous driving controller 410. Vehicle motion controller 430 can monitor vehicle 100 using vehicle related information (e.g. accelerometer, gyroscope, steering angle, motor torque, brake torque) and decide on how to best execute the received instructions. For example, if an instruction is for a strong acceleration and the vehicle has a front and back motor, vehicle motion controller 430 can allocate a certain amount of torque to the front motor and a certain torque to the rear motor to execute the instruction more efficiently (e.g. avoids slip and allow the motors to operate more efficiently). Furthermore, vehicle motion controller 430 can determine that instructions directed towards adjusting the angle of steering should be directed to steering controller 470. Vehicle motion controller 430 can send the further processed instructions to each actuation controller directly, through gateway 440, or other communication pathways. Similarly, vehicle motion controller 430 can determine whether a single controller or a combination of controllers should be used to accomplish an instruction. Vehicle motion controller 430 can also monitor how actuation controllers are executing the further processed instructions and adapt to how the actuation controllers are performing. For instance, if vehicle motion controller 430 sent instructions to steering controller 470 to adjust steering angle 3 degrees but steering controller only adjusts steering angle 2 degrees then vehicle motion controller 430 can adjust the next instruction by adding 1 degree. Thus, vehicle motion controller 430 is able to adapt, in real time, to how the actuation controllers are executing vehicle motion controller's 430 further processed instructions.

Figure 5:
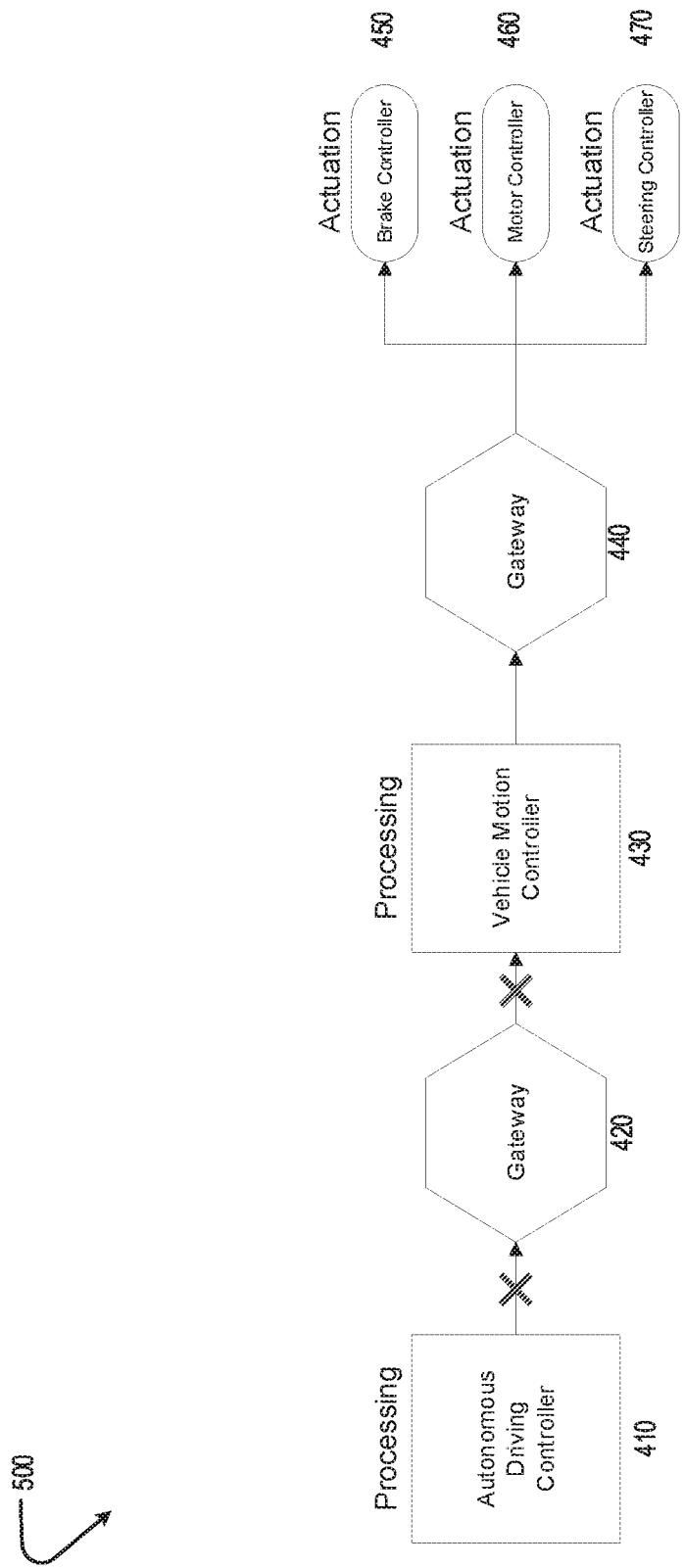
FIG. 5 shows an autonomous vehicle control authority architecture where communication is lost between the autonomous driving controller and the vehicle motion controller.

FIG. 5 shows a situation where communication between autonomous driving controller 410 and vehicle motion controller 430 has been lost. As shown by the "X" symbols, communication can be lost between the autonomous driving controller 410 and vehicle motion controller 430 for many reasons some of which include hardware failure, software error, disconnection (hardwire or wireless), battery failure, and/or any combination thereof. In order to mitigate against these types of errors, autonomous driving controller 410 can determine an additional set of instructions that can be used to guide vehicle 100 to safely stop.

When autonomous driving controller 410 creates the autonomous driving instructions, the autonomous driving controller 410 can also create (simultaneously or serially) an alternative set of instructions corresponding to an emergency operational mode (hereinafter "emergency instructions"). Autonomous driving controller 410 can determine the emergency instructions in the same fashion as it determined the autonomous vehicle instructions. Namely, it will use the same sensing data it received from the aforementioned sensors and determine a set of instructions that will avoid hitting, or colliding with, proximate vehicles and bring vehicle 100 to a safe stop. For instance, autonomous driving controller 410 may be able to determine that vehicle 100 is in the right-most lane and needs to safely pull onto the shoulder of the road, located left of the left-most lane; autonomous driving controller 410 can determine the safest path to the shoulder based on global sensor data received such as proximate vehicles or other vehicles quickly approaching vehicle 100.

Similarly, the emergency instructions can be continuously determined and sent (or updated) from the autonomous driving controller 410 to the vehicle motion controller 430 in real time or substantially in real time. The emergency instructions may be similar or different than the first set of instructions. Once the emergency instructions have been determined (in a similar fashion as the set of autonomous driving instructions), they can be sent to vehicle motion controller 430, along with the autonomous driving instructions. In some embodiments, the received emergency instructions are processed by vehicle motion controller 430 at the same time as the autonomous driving instructions. However, one skilled in the art can appreciate the emergency instructions may be processed before or after the autonomous driving instructions are processed. Once the emergency instructions are processed by the vehicle motion controller 430, the further processed emergency instructions can be sent to the actuation controllers. vehicle motion controller 430 can store the latest sent (or updated) set of emergency instructions. The actuation controllers will store the further processed emergency instructions.

The emergency instructions may be executed if it has been determined that communication has been lost between the autonomous driving controller 410 and one or more other portions of autonomous authority architecture 400; this is known as primary failure 500. If there has been primary failure 500 then the vehicle motion controller 430 will execute the last received set of emergency instructions from the autonomous driving controller 410 to the best of its abilities. Although vehicle motion controller 430 is "blind", it can still determine vehicle-related information, which can aid vehicle motion controller 430 to make a safe stop. In order to determine whether a primary failure 500 has occurred, the vehicle motion controller 430 may be continuously pinging autonomous driving controller 410 to check for connectivity. Alternatively, autonomous driving controller 410 may be continuously pinging vehicle motion controller 430. One skilled in the art would be able to appreciate there are several methods to determine connectivity between autonomous driving controller 410 and vehicle motion controller 430, for example checking message files for errors, checking link status by internodal node status pings and responses such as used in the Internet Control Message Protocol, checking timestamps in received messages to determine changes in message transmission speed, monitoring line voltage, checking message counters, checking messages checksums and/or any combination thereof. Once vehicle motion controller 430 has determined a primary failure 500 has occurred, the vehicle motion controller 430 can execute the last received emergency instructions.

Figure 6:
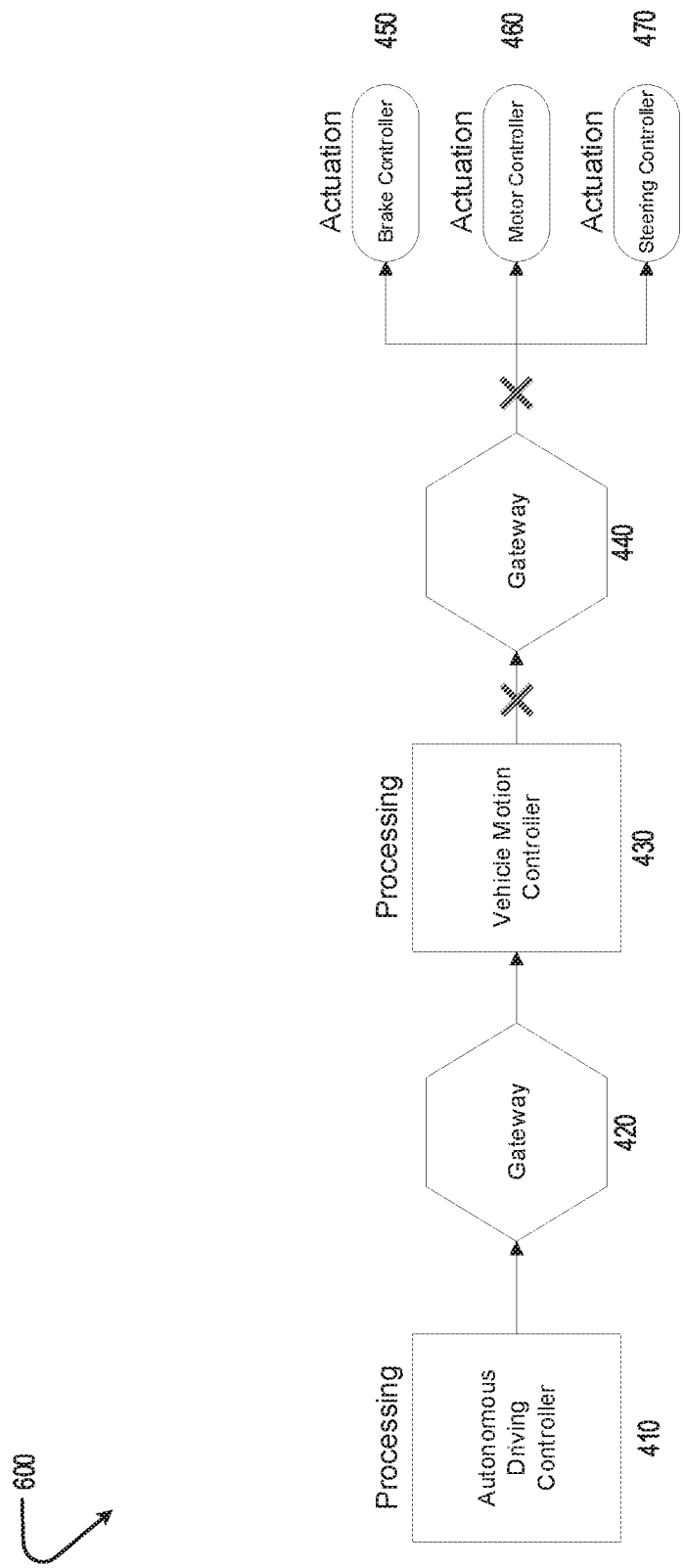
FIG. 6 shows an autonomous vehicle control authority architecture where communication is lost between the vehicle motion controller and the actuation controllers.

FIG. 6, shows a situation where (as shown by the "X" symbols) communication is lost between the vehicle motion controller 430 and the actuation controllers; this is known as secondary failure 600. In secondary failure 600 where there is no communication between the actuation controllers and the rest of autonomous authority architecture 400, the actuation controllers will execute the last set of emergency instructions sent from the vehicle motion controller 430. Actuation controllers are truly "blind" because they cannot receive any sensed object information, vehicle-related information, or exterior environmental information. This makes a secondary failure 600 somewhat worse than a primary failure 500. The actuation controllers will execute the last set of received further processed emergency instructions as closely as possible; however, vehicle motion controller 430 will not be able to make additional adjustments if actuation controllers fail to perfectly execute their instructions.

Figure 7:
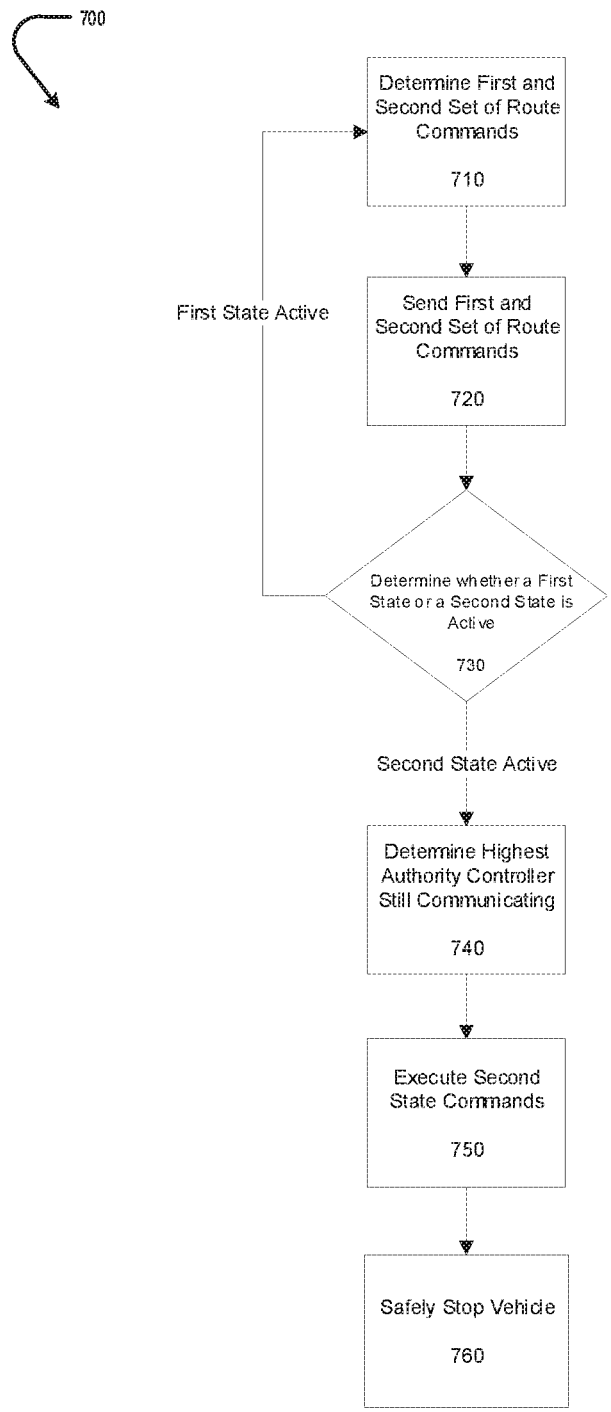
FIG. 7 shows a method of implementing emergency route guidance.

FIG. 7, shows a method 700 for executing emergency route guidance. The method 700 is merely a single embodiment of the method used safely stop vehicle 100 and does not encompass all embodiments. Autonomous driving controller 410 receives environmental information and can determine/generate a set of autonomous driving instructions and a set of emergency instructions 710, based on the environmental information. Both of these sets of instructions can be determined simultaneously in real time, or one may be determined before the other. Once these sets of instructions have been determined 710, they can be sent 720. The vehicle motion controller 430 can receive the instructions; however in some embodiments, actuation controllers can directly receive sets of instructions. The controller that receives the sets of instructions may then determine if a controller has stopped communicating, once communication has stopped. Once communication has stopped, an emergency operational mode is engaged. Once emergency operational mode has been engaged, the most capable controller still communicating must be determined 740. The highest authority controller will be able to best execute the last set of instructions that were received. For instance, if the vehicle motion controller 430 is the highest capable controller still communicating with the actuation controllers, then the vehicle motion controller 430 is in the best position to execute 750 the emergency instructions. The highest capable controller can be predetermined. When two controllers have similar capabilities or are peers of each other, an arbitration procedure can be employed to identify which of the two competing controllers is the master controller, thereby avoiding system conflicts. The actuation controllers will then execute the received further processed emergency instructions in order to safely stop 760 vehicle 100.

The exemplary systems and methods of this disclosure have been described in relation to an autonomous authority architecture 400 and emergency route guidance systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Any one or more of the aspects/embodiments as substantially disclosed herein optionally in combination with any one or more other aspects/embodiments as substantially disclosed herein.

One or more means have been adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors, as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries,

What is claimed is:

1. A system for route guidance, the system comprising:
   a driving controller configured to receive sensor output from at least one sensor sensing an environment surrounding a vehicle in motion, wherein, based on the received sensor output, the driving controller determines, for a common time interval, a first set of instructions for guiding the vehicle along a first path and a second set of instructions for guiding the vehicle along a second path different than the first path;
   a vehicle motion controller configured to:
      receive, from the driving controller, the first and second sets of instructions;
      store the first and second sets of instructions in a memory of the driving controller; and
      process the first set of instructions and the second set of instructions; and
   at least one actuation controller configured to:
      receive the processed first set of instructions and the processed second set of instructions from the vehicle motion controller;
      store the processed first and second sets of instructions in a memory of the at least one actuation controller; and
      control, during the common time interval, at least one actuator of the vehicle to:
         move the vehicle along the first path according to the processed first set of instructions when the vehicle is in a first state; and
         move the vehicle along the second path according to the processed second set of instructions when the vehicle is in a second state,
      wherein the vehicle motion controller is isolated from the at least one sensor such that the vehicle motion controller processes the first and second sets of instructions without information of the environment surrounding the vehicle as sensed by the at least one sensor,
      wherein the vehicle is in the first state when the driving controller is communicating normally with the vehicle motion controller and when the vehicle motion controller is communicating normally with the at least one actuation controller, and
      wherein the vehicle is in the second state when communication fails between the driving controller and the vehicle motion controller or when communication fails between the vehicle motion controller and the at least one actuation controller.

2. The route guidance system of claim 1, wherein the at least one actuation controller is isolated from the at least one sensor such that the at least one actuation controller moves the vehicle along the first path and the second path without information of the environment surrounding the vehicle as sensed by the at least one sensor, wherein a new first set of instructions and a new second of instructions are continually sent from the driving controller to the vehicle motion controller.

3. The route guidance system of claim 2, wherein each new first set of instructions and each new second set of instructions are sent from the driving controller to the vehicle motion controller about every 100 milliseconds.

4. The route guidance system of claim 1, wherein the vehicle controller determines or receives vehicle-related information based on output of at least one additional sensor coupled to the vehicle controller, wherein the vehicle-related information includes a velocity of the vehicle, and wherein the second path corresponds to a path for an emergency stop of the vehicle.

5. The route guidance system of claim 4, wherein the first path corresponds to a path for normal travel of the vehicle toward a destination.

6. The route guidance system of claim 1, wherein, when the vehicle is in the second state and communication has failed between the driving controller and the vehicle motion controller, the vehicle motion controller processes a most recently stored second set of instructions from the memory of the vehicle motion controller to produce the processed second set of instructions for moving the vehicle along the second path.

7. The route guidance system of claim 6, wherein the vehicle motion controller continually determines whether the vehicle motion controller is in communication with the driving controller, and wherein the actuation controller continually determines whether the at least one actuation controller is in communication with the vehicle motion controller.

8. The route guidance system of claim 6, wherein, when the vehicle is in the second state and communication has failed between the vehicle motion controller and the at least one actuation controller, the at least one actuation controller uses a most recently stored processed second set of instructions from the memory of the at least one actuation controller to move the vehicle along the second path.

9. A method of route guidance, the method comprising:
sensing, via at least one sensor, an environment surrounding a vehicle in motion;
determining, by a driving controller, for a common time interval and based on output of the at least one sensor, a first set of instructions for guiding the vehicle along a first path and a second set instructions for guiding the vehicle along a second path different than the first path;
communicating the first set of instructions and the second set of instructions to a first controller;
storing, at the first controller, the first and second sets of instructions;
processing, by the first controller, the first set of instructions and the second set of instructions;
receiving, by at least one second controller, the processed first set of instructions and the processed second set of instructions;
storing, at the at least one second controller, the processed first and second set of instructions; and
controlling, by the at least one second controller during the common time interval, at least one actuator of the vehicle to move the vehicle along the first path according to the processed first set of instructions when the vehicle is in a first state, and to move the vehicle along the second path according to the processed second set of instructions when the vehicle is in a second state,
wherein the vehicle is in the first state when the driving controller is communicating normally with the first controller and when the first controller is communicating normally with the at least one second controller, and
wherein the vehicle is in the second state when communication fails between the driving controller and the first controller or when communication fails between the first controller and the at least one second controller.

10. The route guidance method of claim 9, wherein the method further comprises determining whether the driving controller is in communication with the first controller.

11. The route guidance method of claim 9, wherein the second path corresponds to a path for an emergency stop of the vehicle.

12. The route guidance method of claim 11, wherein the first path corresponds to a path for normal travel of the vehicle toward a destination.

13. The route guidance method of claim 9, wherein the at least one second controller is isolated from the at least one sensor such that the at least one second controller moves the vehicle along the first path and the second path without information of the environment surrounding the vehicle as sensed by the at least one sensor.

14. The route guidance method of claim 13, wherein the first controller is isolated from the at least one sensor such that the first controller processes the first and second sets of instructions without information of the environment surrounding the vehicle as sensed by the at least one sensor.

15. A device for route guidance, the device comprising:
a first controller configured to receive sensor output from at least one sensor, wherein based on the received sensor output, the first controller determines, for a common time interval, a first set of instructions for guiding a vehicle along a first path and a second set of instructions for guiding a vehicle along a second path different than the first path; and
a second controller configured to:
receive, from the first controller, the first set of instructions and the second set of instructions;
store the first and second sets of instructions in a memory of the second controller; and
process the first set of instructions and the second set of instructions; and
at least one third controller configured to:
receive the processed first set of instructions and the processed second set of instructions from the second controller;
store the processed first and second sets of instructions in a memory of the at least one third controller; and
control, during the common time interval, at least one actuator of the vehicle to:
move the vehicle along the first path according to the processed first set of instructions when the vehicle is in a first state; and
move the vehicle along the second path according to the processed second set of instructions when the vehicle is in a second state,
wherein the vehicle is in the first state when the first controller is communicating normally with the second controller and when the second controller is communicating normally with the at least one third controller, and
wherein the vehicle is in the second state when communication fails between the first controller and the second controller or when communication fails between the second controller and the at least one third controller.

16. The route guidance device of claim 15, wherein a new set of first instructions and a new set of second instructions are continually sent from the first controller to the second controller for different common time intervals.

17. The route guidance device of claim 15, wherein the second controller is isolated from the at least one sensor such that the second controller processes the first and second sets of instructions without information of an environment surrounding the vehicle as sensed by the at least one sensor.

18. The route guidance device of claim 15, wherein the second controller continually determines whether the second controller is in communication with the first controller.

19. The route guidance device of claim 15, wherein the second path corresponds to a path for an emergency stop of the vehicle.

20. The route guidance device of claim 19, wherein the first path corresponds to a path for normal travel of the vehicle toward a destination.

* * * * *